United States Patent [19]
Kurihara et al.

[11] Patent Number: 6,063,492
[45] Date of Patent: May 16, 2000

[54] ADHESIVE TAPE AND ITS BASE FABRIC

[75] Inventors: Kazuhiko Kurihara, Itabashi-ku; Hiroshi Yazawa, Kunitachi; Masato Kimura, Fujisawa; Jun Yamada, Yokosuka, all of Japan

[73] Assignees: Nippon Petrochemicals Company, Ltd; Polymer Processing Research Inst., Ltd., both of Tokyo, Japan

[21] Appl. No.: 08/899,097

[22] Filed: Jul. 24, 1997

[30] Foreign Application Priority Data

Jul. 26, 1996 [JP] Japan ................................ 8-215252

[51] Int. Cl.⁷ ........................................... C09J 7/02
[52] U.S. Cl. ..................... 428/343; 442/149; 442/150; 442/151; 442/394
[58] Field of Search ..................... 442/149, 150, 442/151, 394; 428/343

[56] References Cited

U.S. PATENT DOCUMENTS

| | | |
|---|---|---|
| 3,853,662 | 12/1974 | Yazawa et al. . |
| 3,859,156 | 1/1975 | Yazawa et al. . |
| 4,052,242 | 10/1977 | Yazawa et al. . |
| 4,525,317 | 6/1985 | Okada et al. . |
| 5,312,500 | 5/1994 | Kurihara et al. . |

FOREIGN PATENT DOCUMENTS

| | | |
|---|---|---|
| 0 757 127 A1 | 2/1997 | European Pat. Off. . |
| 44 42 507 | 6/1996 | Germany . |
| 59-21766 | 2/1984 | Japan . |
| 62-28226 | 6/1987 | Japan . |
| 1-204983 | 8/1989 | Japan . |
| 2-269859 | 11/1990 | Japan . |
| 3-36948 | 6/1991 | Japan . |
| 51-37169 | 10/1996 | Japan . |
| 1248731 | 10/1971 | United Kingdom . |

*Primary Examiner*—Jenna Davis
*Attorney, Agent, or Firm*—Scully, Scott, Murphy & Presser

[57] ABSTRACT

A base fabric used for producing an adhesive tape and the adhesive tape with the same, which adhesive tape has good transversely tearable property and small in thickness, said base fabric being composed of at least one longitudinal base material of stretched unidirectionally aligned nonwoven fabric which is made by spinning a thermoplastic resin into a long filament nonwoven fabric and stretching it in one direction so as to aligne its filaments almost in one direction.

10 Claims, 2 Drawing Sheets

ADHESIVE TAPE AND ITS BASE FABRIC

BACKGROUND OF THE INVENTION

(1) Field of the Invention

The present invention relates to an adhesive tape having transversely tearable property which is used for packaging and the like purposes. More particularly, the present invention relates to an adhesive tape having transversely tearable property which is prepared by using a nonwoven fabric stretched mainly in a longitudinal direction that is made by spinning a thermoplastic resin as its longitudinal base material, and by laminating the same with a transverse base material, an adhesive layer and a release layer.

It is to be noted that the term "longitudinal base material" used herein means the orienting direction of fibers contained in the material extends in the longitudinal direction of the resulting adhesive tape, and the term "transverse base material" means the orienting direction of fibers in the material extends in the direction perpendicular to the longitudinal direction of the adhesive tape.

(2) Prior Art

In the field of adhesive tape, a woven fabric of spun yarns mainly made of rayon staple fiber or cotton has been hitherto employed. There are, however, such problems that spun yarn is not strong and that, in a wet condition, the spun yarn is swollen or low in strength. In addition, it has been difficult to produce hitherto demanded thin adhesive tapes. Furthermore, the fluctuations in the market prices of rayon staple fiber and cotton are large in an economical viewpoint, so that it has not been suitable as an industrial raw material which is required for the stable supply in the case of adhesive tape. In this respect, a base cloth for pressure sensitive adhesive tape prepared from vinylon or polyester long fiber filaments has been investigated. However, because the woven fabric made of these synthetic fibers have poor transversely tearable property, it is required to densely weave thin yarns for avoiding such disadvantages as described above (Japanese Laid-open Patent Publication Nos. Sho 58-91845, Sho 60-71735, Sho 63-306037, and Hei 5-44135, etc.), so that the weaving cost therefor increases, and the resulting product is poor in the quality and the cost efficiency. For these reasons, the woven fabric of spun yarns made of rayon staple fiber could not have sufficiently been replaced by the adhesive base cloth made of such synthetic fiber as described above. There is an adhesive base cloth likewise made of polyolefin flat yarns as a raw material (Japanese Laid-open Utility Model Publication No. Hei 2-3821, etc.). However, because the resulting base cloth has poor transversely tearable property, it is required to densely weave thin yarns for eliminating the disadvantage described above, so that the weaving cost therefor increases and the resulting product is also poor in the quality and the cost efficiency, besides this product involves another disadvantage of low heat resistance because the raw material is a polyolefin.

In the meantime, with the recent development in automated machines such as automatic packaging machines, the operation speed of them are increased, so that the frequency for changing adhesive tapes to be used becomes over several times in an hour. Because this is very troublesome, it has been required to increase the roll length of an adhesive tape by reducing the thickness thereof while maintaining the same diameter of a roll. In this respect, however, it was difficult to reduce the thickness of such an adhesive tape, because the yarns contained in a woven fabric are bent.

The present inventors have developed and industrialized various types of cross-laminated nonwoven fabric which is prepared by cross-laminating a longitudinally aligned nonwoven fabric having high strength in its longitudinal direction with a transversely aligned nonwoven fabric having high strength in its transverse direction (Japanese Patent Publication Nos. Sho 49-48580, Sho 50-40185, Sho 53-38783, Sho 55-51058, Sho 57-30368, Sho 57-54581, Sho 62-28226, Hei 1-60408, and Hei 3-36948 etc.). The application of these cross-laminated nonwoven fabrics for an adhesive tape has been tried (Japanese Laid-open Patent Publication Nos. Sho 58-106737 and Hei 1-204983, etc.). In accordance with the present invention, the above-mentioned projects have been further improved and developed.

A cross-laminated nonwoven fabric is manufactured in accordance with such a manner wherein a longitudinally aligned nonwoven fabric is cross-laminated with a transversely aligned nonwoven fabric, and the productivity thereof ranges from 40 m/min. to 100 m/min. On the other hand, it is necessary for utilizing thin yarns to prepare a dense woven fabric for the sake of increasing the transversely tearable property in a base cloth for adhesive tape. Accordingly, it is difficult to attain the productivity of 1 m/min. or higher in the latter case, even if a recently improved weaving machine is employed. In other words, the productivity in the cross-laminated nonwoven fabric according to the present invention is higher than that of a woven fabric for cloth adhesive tape by around 100 times.

Moreover, the transversely tearable property is obtained by a tearing mechanism wherein tear stress propagates effectively in the transverse direction of a tape. For this reason, it is required to densely weave the woven fabric in such a degree that the looseness of the texture is lost. However, a densely woven fabric contains bent yarns so that such woven fabric does not efficiently exhibits the strength of filaments. Accordingly, about 70 to 80% of the strength of original yarn is merely utilized in such case as described above. On the contrary, because the filaments are not bent in a cross-laminated nonwoven fabric, the strength of the filaments composing the nonwoven fabric is demonstrated sufficiently. Furthermore, because the strength of filaments contained in a cross-laminated nonwoven fabric is efficiently utilized, the amount of the filaments to be used becomes comparatively small in comparison with that of a densely woven fabric. In addition, because the filaments are not bent in a cross-laminated nonwoven fabric, the thickness of obtained filament layer is small, as a result, it is possible to provide a thin adhesive tape.

While a cross-laminated nonwoven fabric has the characteristic features as described above, the longitudinally aligned nonwoven fabric contained therein prevents the effective transverse propagation of transverse tear stress, because the longitudinally aligned nonwoven fabric exists independently from the transversely aligned nonwoven fabric in the case that the cross-laminated nonwoven fabric is used as the base cloth for adhesive tape. As described above, it is necessary to solve the problem of transversely tearable property due to the structure peculiar to stretched nonwoven fabric.

Then, it is the same in either case of woven fabric or stretched nonwoven fabric, there is a need for processing such woven or nonwoven fabric with an adhesive dissolved in an organic solvent in order to enhance the adhesive property relative to an extrusion laminated polyethylene which is used as the release layer in most cases in the event where rayon staple fiber or polyester is used for the base material, which processing is called as "anchoring treatment". An example of the agent for the anchoring treatment includes generally a toluene solution of an alkyl titanate and the like, and other primers such as epoxy type, acrylic type, polyethylene imine type, and isocyanate type primers may also be used.

The anchoring treatment, however, requires not only an extra cost for adhesive, but also an extra equipment and work site for effectively removing the exhaust gas of the organic solvent in view of the controlling of environmental pollution. Moreover, if any trouble is caused to occur in such a processing equipment, there remains many problems to be solved in the cost, safety, and the control for environmental pollution. It is also the subject matter of the present invention to provide the adhesive tape which can be produced without using such an anchoring agent.

BRIEF SUMMARY OF THE INVENTION

The present inventors have made eager investigations so as to solve the problems as described above in the prior art. As a result, it has been found out that an excellent base fabric for adhesive tape is obtained by using a stretched unidirectionally aligned nonwoven fabric made from a thermoplastic resin as the longitudinal base material, so that the present invention has been accomplished.

More specifically, the first aspect of the present invention resides in a base fabric for an adhesive tape which is characterized in that the base fabric is composed of at least one longitudinal base material of a stretched unidirectionally aligned nonwoven fabric which is made by spinning a thermoplastic resin into a long fiber nonwoven fabric, and stretching it in one direction so as to align the fibers almost in one direction. The resulting stretched unidirectionally aligned nonwoven fabric is quite suitable as the longitudinal base material of a tape.

The second aspect of the present invention resides in the base fabric for an adhesive tape as defined in the first aspect, characterized in that a unidirectionally oriented material, as a transverse base material, is laminated with the above longitudinal base material. According to this alignment, a base fabric having good transversely tearable property can be obtained.

The third aspect of the present invention resides in the base fabric for an adhesive tape as defined in the first or the second aspect, characterized in that the fineness of fiber of the stretched unidirectionally aligned nonwoven fabric is 1 denier or less and the strength of the nonwoven fabric as a whole is 1 g/denier or higher.

The fourth aspect of the present invention resides in the base fabric for an adhesive tape as defined in any one of the first through third aspects, characterized in that said thermoplastic resin is polyester or polypropylene.

The fifth aspect of the present invention resides in the base fabric for an adhesive tape as defined in any one of the second through fourth aspects, characterized in that said unidirectionally oriented material is any one of the group consisting of the stretched unidirectionally aligned nonwoven fabric, a unidirectionally aligned material of flat yarn, a unidirectionally aligned material of split web, and a unidirectionally aligned material of slit tape.

The sixth aspect of the present invention resides in the base fabric for an adhesive tape as defined in any one of the second through fifth aspects, characterized in that said longitudinal base material and said transverse base material are thermally bonded by embossing with the use of an embossing pattern having transverse straight line pattern components. In other words, the base fabric for the adhesive tape is prepared by bonding the longitudinal base material to the transverse base material by means of embossing treatment.

The seventh aspect of the invention resides in the base fabric for an adhesive tape as defined in the first aspect, characterized in that said longitudinal base material is thermally bonded by embossing with the use of an embossing pattern having transverse straight line pattern components. As a result of this embossing treatment, the fibers of the longitudinal base material are joined and the resulting adhesive tape can exhibit transversely tearable property.

Furthermore, the eighth aspect of the present invention resides in an adhesive tape which is characterized by that the adhesive tape is made by applying an adhesive layer to one side surface of any one of the base fabrics as defined in the first through seventh aspects.

The ninth aspect of the present invention resides in the adhesive tape defined in the eighth aspect, characterized in that a synthetic resin layer is applied to at least the other side of said base material.

The tenth aspect of the present invention resides in the adhesive tape defined in the ninth aspect, characterized in that said synthetic resin layer is a transversely stretched film. According to this alignment, transversely tearable property is obtained by the transversely stretched film contained in the laminated layers even in case of the first aspect of the invention wherein no transverse base material is included.

Moreover, the eleventh aspect of the present invention resides in the adhesive tape, characterized in that an adhesive layer is applied to the transverse base material of said base fabric for adhesive tape as defined in any one of the second through sixth aspects, and a release layer is applied to the longitudinal base material. In this case, either a synthetic resin layer may be applied as the release layer, or a silicone-base releasing agent or the like may be applied.

BRIEF DESCRIPTION OF THE DRAWINGS

The present invention will become more fully understood from the detailed description given hereinafter and the accompanying drawings which are given by way of illustration only, and thus are not limitative of the present invention, wherein:

FIG. 4, (A), (B), (C) and (D) are plan views each showing an embossing pattern.

DETAILED DESCRIPTION OF THE INVENTION

The present invention will be described in more detail hereinafter.

In the present invention, a nonwoven fabric which is made by spinning a thermoplastic resin into a long fiber nonwoven fabric and by stretching in one direction so as to align its fibers almost in one direction, is employed as the the longitudinal base material for a stretched nonwoven fabric so as to improve the transversely tearable property. In the case that fine filaments of 1 denier or less are aligned in parallel, individual filaments are torn off separately by transverse tear stress, so that the tearing can propagate by small tearing stress.

In an ordinary woven fabric, because the tear stress acts on the yarns as bundles of filaments, tearing is difficultly caused to occur. In the invention filed prior to this application (Japanese Laid-Open Patent Publication No. Sho 60-71735 etc.), it is described that yarns are woven in a substantially non-twisted state, but a non-twisted yarn, particularly a yarn composed of filaments of 1 denier or less is difficult to be handled in woven fabric, so that the productivity is low, in addition, its effect is hardly attained because the yarns are undesirably twisted in the course of weaving.

In the present invention, it is also possible to use a fabric wherein fineness of non-twisted yarn is adjusted in place of a unidirectionally stretched nonwoven fabric as the longitudinal base material. However, it is difficult to attain fineness adjustment of a fine yarn composed of filaments of 1 denier or less, and the speed of production becomes low. In this respect, the present inventors have already proposed that a nonwoven fabric prepared by stretching longitudinally a continuous material of spun and accumulated webs is utilized as the longitudinal base material (Japanese Patent Publication Nos. Hei 3-36948, and Hei 7-6126). According to this method, filaments of 2 to 3 denier are spun in the spinning step as in the case of usual nonwoven fabric and, when the spun filaments are stretched in the longitudinal direction by 5 to 8 times in length, the fineness of the resulting filament becomes 1 denier or less. In this case, the filaments are not oriented in the spinning step and the accumulated filaments are aligned longitudinally. Accordingly, it becomes possible to carry out longitudinal stretching and to improve the strength after the stretching. However, because the longitudinal alignment of filaments contained in the accumulated webs in the spinning step is not perfect, the stretched filaments contain a small quantity of unstretched filaments and non-aligned filaments, so that a longitudinal base material mainly composed of filaments of 1 denier or less in fineness is obtained. These unstretched filaments low in melting point so that they are melted during the stretching step and succeeding heat treatment step to give an effect like an adhesive for the filaments contained in the longitudinal base material. As a result, the looseness among filaments is lost and the transversely tearable property is improved.

The longitudinally stretched nonwoven fabric prepared as described above has a strength of 1 g or higher per denier (hereinafter referred to simply as "d"), and preferably a strength of 1.5 g/d or higher, and more preferably 2 g/d or higher in strength. When the strength is less than 1.0 g/d or less, satisfactory fiber alignment and stretching cannot be done, so that the rubber-like elasticity remains in the filaments, the tearable property is lowered and the strength is not high enough. Accordingly, such nonwoven fabric as described above is not suitable for the longitudinal base material used for an adhesive tape.

Most of the individual filaments contained in the longitudinally stretched nonwoven fabric according to the present invention have a strength of 3 g/d to 5 g/d. In this respect, however, because there are various filaments in a mixed state and this state is complicated, the strength of a nonwoven fabric will be expressed hereinafter by the strength of web of the longitudinal base material. The strength of web is generally represented by kilogram per square millimeter, but it will be represented herein by g/d, because the base material used in the present invention is a mass of filaments, so that the cross sectional shape is not stable because it is changed with the pressure applied thereto. In the test, ten test pieces, each having 50 mm width and 300 mm length, are cut out from a longitudinal base material, the denier (d) of each test piece is measured, then, the strength is measured with 100 mm chuck distance and at 100%/min. in the rate of elongation, and the average value (g/d) of the test pieces is calculated.

Incidentally, as a production method of nonwoven fabric composed of filaments of 1 d or less, melt-blow method is well known. In the melt-blown nonwoven fabric, however, the filaments are not aligned longitudinally, so that the strength of the nonwoven fabric in the longitudinal direction is as very low as 0.3 g/d or lower.

As the spinning methods for preparing the longitudinal base material according to the present invention, the mixed spinning method and the conjugate spinning method in which different kinds of polymers of an adhesive polymer and an ordinary polymer are used as disclosed in the prior invention of PCT WO96/17121, are particularly suitable. This is because of the fact that the filaments of longitudinal base material are bonded together by means of these adhesive polymer components, and further the adhesion with the transverse base material is also improved, so that the transversely tearable property is improved.

Used as the transverse base material in the present invention is a transversely stretched nonwoven fabric composed of filaments which are prepared by stretching transversely a continuous material of spun and accumulated webs as disclosed in the prior inventions of Japanese Patent Publication Nos. Hei 3-36948 and Hei 7-6126, and Japanese Laid-Open Patent Publication No. Hei 2-269859). The nonwoven fabric of this kind is thin and flexible, and has cloth-like touch feeling, by which high-graded feeling can be produced.

Another kind of usable transverse base material is exemplified by a transversely aligned material of flat yarns prepared by stretching polyolefin narrow tapes (Japanese Patent Publication Nos. Sho 53-38783, Sho 57-54581, and Sho 59-6943). Because the flat yarn with a certain width adheres firmly to the longitudinal base material, the longitudinal filaments are firmly fixed and the transversely tearing stress is lowered. Furthermore, the resulting flat filaments function as a rigid body with a certain width to prevent the change of the transversely tearing stress in the longitudinal direction, and as a result, linearity of transversely tearing is improved.

As a still other usable transverse base material, there is a transversely aligned material of wide split webs (Japanese Patent Publication Nos. Sho 51-37169, Sho 53-38783, Sho 57-30368, Sho 62-28226, and Hei 1-60408). In this case, the productivity of the transverse base material is raised in addition to the characteristic properties of the above-mentioned flat yarns, by which a cross-laminated nonwoven fabric can be efficiently produced.

As a still other usable transverse base material, there is a transversely aligned material of slit webs. This transverse base material is made through a process, for example, that a triple-layer film is prepared by laminating layers of modified polypropylene to both surfaces of a layer of straight polypropylene and the resulting film is subjected to rolling, after that numerous slits in transverse direction are formed in cross-stitch pattern. The laminated film is further stretched in the transverse direction.

As another usable transverse base material, there is a transversely stretched film. It can function as a release layer in addition to the characteristic properties as those of the above-described flat yarns or wide split webs. As a result, an adhesive tape which is excellent in the productivity and low in cost can be provided by this transversely stretched film.

Polymers used for the longitudinal base material and the transverse base material according to the present invention include polyolefins such as high-density polyethylene and polypropylene as well as the polymers used for flat yarns and fibers for industrial material such as nylon, polyester, polyvinyl alcohol and polyacrylonitrile. Particularly, polypropylene and polyester are preferable in view of cost, handling properties and so forth.

One of the characteristic features of the present invention resides in that the use of polyester was realized, which material had been strongly desired in practical production in view of its humidity resistance, thermal resistance and production cost.

Another important problem solved by the present invention is the fact that the movement of the filaments in a longitudinal base material is limited, whereby the filaments of the longitudinal base material are fixed firmly to the transverse material. If they are not firmly fixed, these filaments are caused to move by sliding aside when transversely tearing stress acts upon the filaments in the longitudinal base material and, as a result, the effect that the thin filaments of longitudinal base material are individually torn off to cut off the adhesive tape by small tearing stress is not produced, but large tearing force is required. In the case of woven fabric, entangled portions of densely crossed yarns function to limit the movement of yarns.

Thermal embossing adhesion is utilized as the bonding method for the stretched nonwoven fabric according to the present invention. The thermal embossing adhesion is a method of thermal bonding under pressure in which projections heated to a temperature equal to or higher than the softening point of the filaments are pressed to the material to be bonded. The shape of each projection may optionally be selected depending upon desired uses and aimed adhesive strength. The present inventors have found out that an embossing pattern having transverse straight line components improves the transversely tearable property.

Furthermore, in accordance with the same principle as that of the thermal embossing, the ultrasonic bonding method can be used, in which method an embossing pattern is placed on a material to be bonded and ultrasonic horns are brought into contact with the pattern. The above treatment methods are generically called as "embossing treatment".

The present inventors have found out that various adhesives are effectively used for bonding the longitudinal base material to transverse base material. Such adhesives do not only bond efficiently the longitudinal and transverse base materials to each other, but also exhibit the effect that each gap defined between filaments in the longitudinal base material is filled with the adhesive to reduce the looseness in the filaments, whereby the transverse tearable property is improved.

The release layer which is used for an ordinary cloth adhesive tape is a low-density polyethylene prepared through extrusion lamination method. In this case, it is required to treat the surface of the base fabric with a toluene solution of an alkyl titanate and the like as an anchoring treatment which is done for giving adhesiveness between the polyethylene layer and a base material of staple fiber or polyester cloth. In this respect, the adhesive in the present invention can attain this anchoring treatment. Furthermore, if the used adhesive is reactive one, some of the adhesive exhibits releasability after reaction. In such a case, the adhesive layer after the reaction functions also as a release layer, so that there is no need of providing separately a new release layer.

As described above, when an adhesive is employed, it becomes possible to omit the step of anchoring treatment and the step of applying a release layer. Therefore, the use of a suitable adhesive involves considerable merits in view of the simplification of process steps and the improvement in cost efficiency.

Various kinds of adhesives can be used, which are exemplified by those of emulsion type, solvent type, powder type, fiber type, hot-melt type, and UV-curing type.

As described above, it is important in the present invention to maintain adhesiveness between a longitudinal base material and a transverse base material. In order to improve the adhesiveness, it has been found out by the present inventors that the corona discharge treatment to a longitudinally stretched nonwoven fabric is particularly effective. This effect is particularly remarkable in the case where the longitudinally stretched nonwoven fabric is composed of polyester filaments. It is considered that this effect is due to the fact that a filament diameter of the longitudinal base material is small and the surface area is large.

Furthermore, it is to be noted that the corona treatment can be replaced by plasma treatment, flame treatment or the like having equivalent effect. These treatments are hereinafter referred to as "corona treatment".

A variety of adhesive agents such as natural rubber base, synthetic rubber base, acrylic base, and hot-melt base ones ca be used for forming the adhesive layer in the present invention. If a thin adhesive layer is desirable, an acrylic adhesive agent is selectively used, which forms a thin and strongly adhesive layer.

The present invention will be described in more detail with reference to typical examples.

EXAMPLE 1

Figure 1:
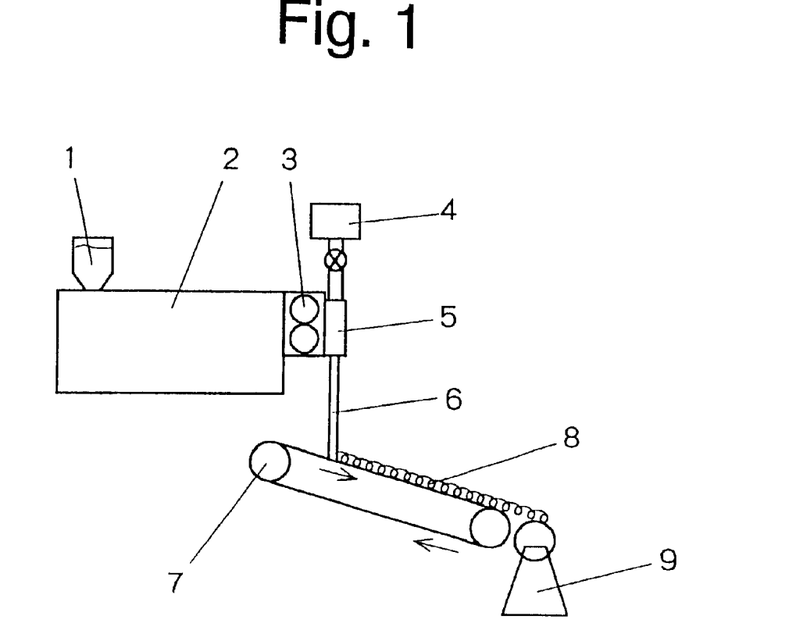
FIG. 1 is a schematic side view showing an example of a process for manufacturing a longitudinal base material.

Referring now to FIG. 1, an example of a method for producing the longitudinal base material according to the present invention will be described (Japanese Patent Publication Nos. Hei 3-36948 and Hei 7-6126).

A raw material polyester resin 1 [IV (intrinsic viscosity) value: 0.65, melting point: 255° C., manufactured by Yunitika K.K.] was melted and kneaded by means of an extruder 2 and it was extruded quantitatively with a gear pump 3. It was then spun together with hot air supplied from a hot air generator 4 into filaments through a melt-blow die 5.

The spun filaments 6 were accumulated on an inclined conveyor 7 to form an accumulated web 8, and it was taken up by a winding device 9.

The accumulated web 8 thus taken up was passed through rolls (not shown) to carry out stretching in the longitudinal direction by 5.8 in stretching ratio, thereby obtaining a longitudinal base material. The fineness of the filaments composing the longitudinal base material was determined by photographic measurement, and the calculated value was around 0.3 denier in mean value.

Furthermore, the strength of the thus obtained stretched web was 2.2 g/d.

Figure 2:
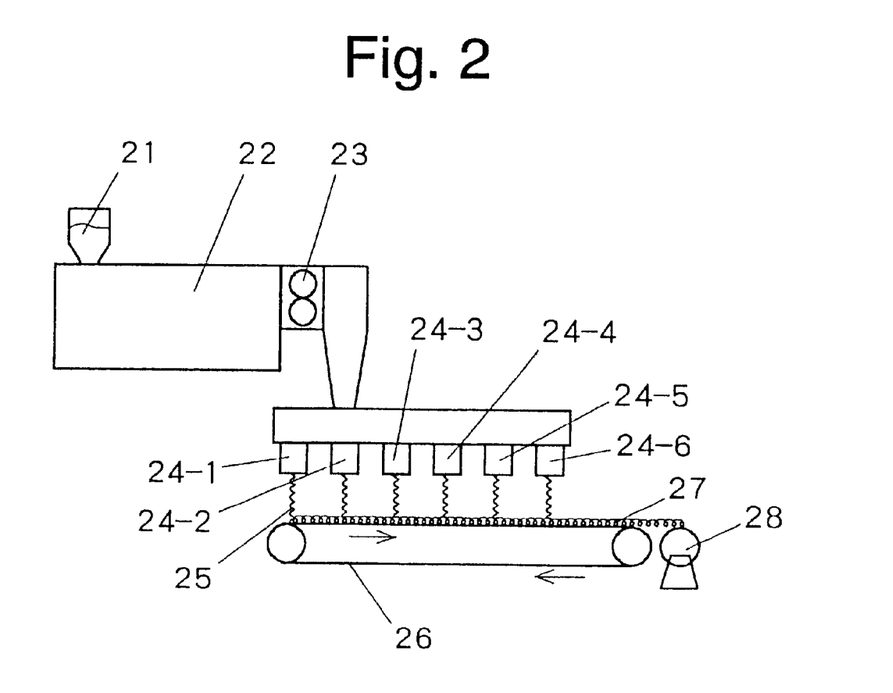
FIG. 2 is a schematic side view showing an example of a process for manufacturing a transverse base material.

Referring to FIG. 2, an example of the method for producing the transverse base material according to the present invention will be described (Japanese Patent Publication No. Hei 3-36948 and Japanese Laid-Open Patent Publication No. Hei 2-242960).

A raw material polyester resin 21 (IV value: 0.60, made by Yunitika K.K.) was melted and kneaded by means of an extruder 22, the molten resin was extruded quantitatively by a gear pump 23, and it was introduced into a plurality of spray nozzles 24-1 to 24-6. The spun filaments 25 discharged from the nozzles were scattered by the action of hot air (not shown) in the transverse direction with respect to the moving direction of a conveyor 26 to form an accumulated web 27 of the transversely aligned filaments, and the resulting web was taken up by a winding device 28.

The transversely aligned accumulated web 27 thus wound up was transversely stretched by means of the transversely stretching device disclosed in Japanese Patent Publication No. Hei 3-36948, by 5.6 in stretching ratio to obtain a transverse base material.

Figure 3:
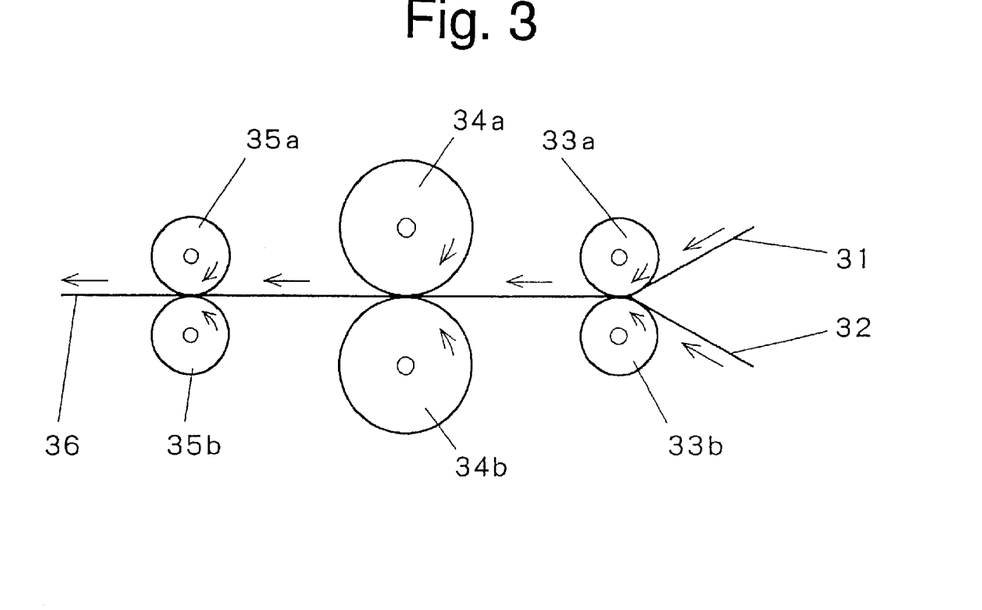
FIG. 3 is a schematic side view showing an example of an embossing apparatus.

The longitudinal base material and the transverse base material prepared as described above were subjected to fusion bonding by using the embossing apparatus shown in FIG. 3.

In the embossing apparatus, a longitudinal base material 31 and a transverse base material 32 were fed into a pair of nip rolls 33a and 33b. Both the base materials from the rolls were subjected to the embossing treatment between an embossing roll 34a and a backing roll 34b which were heated to 220° C. The base materials thus treated by embossing were taken out through nip rolls 35a and 35b to obtain a cross-laminated nonwoven fabric 36.

FIGS. 4 (A) to 4 (D) show examples of embossing patterns, respectively in enlarged scales. In Example 1, the pattern shown in FIG. 4(A) was used, in which pattern lines of 1.25 mm in length and 0.35 mm in width are aligned in cross-stitch pattern staggered with a pitch of 1.25 mm.

The cross-laminated nonwoven fabric 36 was then subjected to an anchoring treatment using a toluene solution of alkyl titanate and a release layer was formed on the side of the longitudinal base material by extrusion lamination with low-density polyethylene, and further, an adhesive layer was applied to the side of the transverse base material to obtain an adhesive tape.

The properties of the adhesive tape manufactured by the above-described method are shown in Table 1A.

In the Table, polyester is indicated with an abbreviation of PET; polyethylene, PE; polypropylene, PP; and high-density polyethylene HDPE.

Furthermore, the tenacity of the adhesive tape indicates a value only in the longitudinal direction, and the measurement was done with a chuck distance of 50 mm at a pulling rate of 100 mm/min. The tearing strength was measured by Elmendorf tearing tester in accordance with JIS L 1096, and the obtained value only in the transverse direction is indicated.

As a result of employing the embossing patterns containing no straight line component in the transverse direction as shown in FIGS. 4 (C) and 4 (D), it was found out that the linearity in tearing was not good.

EXAMPLE 2-1

A web 8 of 2/3 in basis weight as compared with the web used in Example 1 was prepared in accordance with the same spinning method as that of Example 1. Another web 8' of 1/3 in basis weight as compared with the web used in Example 1 was separately prepared by spinning a polyester resin of 225° C. in melting point (IV value: 0.65; made by Yunitika K.K.) in the same manner as that of Example 1. The web 8 and the web 8' were put in layers and they were stretched to obtain a longitudinal base material having a fineness of 0.7 denier after the stretching.

Then, the web 8' was laminated as a transverse base material in the like manner as in Example 1, and they were subjected to embossing and the formation of release layer and adhesive layer to prepare an adhesive tape. The results are shown in Table 1A. In this case, the tearable property was better than that of Example 1.

EXAMPLE 2-2

An adhesive tape was prepared in the like manner as in Example 2-1 except that the transverse base material was not used. The results are shown in Table 1A.

EXAMPLE 3-1

The longitudinal base material and the transverse base material were prepared in the like manner as in Example 1 and they were put in layers. The obtained web was dipped into a mixed aqueous solution of adhesives, i.e., water-soluble urethane (trademark: Superflex E2000 made by Dai-ichi Kogyo Seiyaku K.K.) and ethylene-vinyl acetate copolymer emulsion (trademark: Sumikaflex 471 made by Sumitomo Chemical Co., Ltd.). The web was then squeezed so as to adjust the content of adhesive as solid was 28% by weight relative to the total weight and it was subjected to heat treatment on a heating cylinder to be dried. After that, corona treatment was applied to the side of the longitudinal base material and it was then subjected to extrusion lamination with low-density polyethylene, and further, an adhesive agent was applied to the side of the transverse base material to obtain an adhesive tape. The results are shown in Table 1B.

The obtained adhesive tape exhibited good transversely tearable property.

EXAMPLE 3-2

Figure 4A:
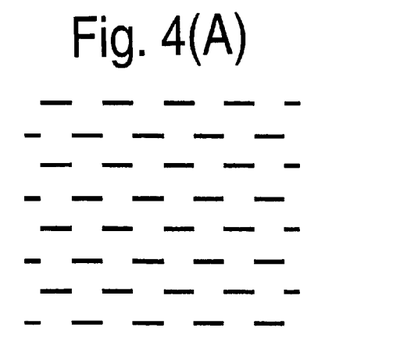
Figure 4B:
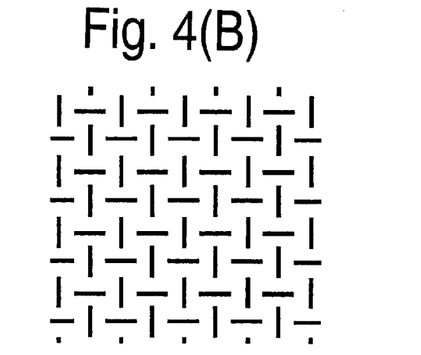
Figure 4C:
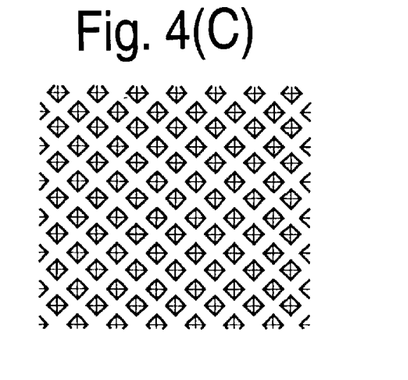
Figure 4D:
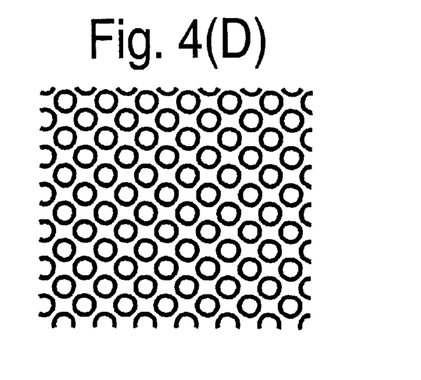

The test was done in the like manner as in Example 3-1. After the adhesive agent was dried, the embossing treatment was carried out by using the pattern shown in FIG. 4 (B). The subsequent steps were carried out also in the like manner as in Example 3-1. The results are shown in Table 1B.

As a result of the embossing treatment, the transversely tearable property was improved, and cloth-like feeling was added, so that the obtained adhesive tape gave a high-graded impression.

EXAMPLE 4

A longitudinal base material and a transverse base material prepared in the like manner as in Example 1 were subjected to corona treatment, respectively. Both the base materials were put in layers together. The obtained web was dipped into a reactive acrylic emulsion (trademark: Dicnal E 8300 K made by Dainippon Ink & Chemicals, Inc.) The web was squeezed so as to adjust the content of adhesive as solid was 38% by weight with respect to the total weight. It was then dried on a heating cylinder. The drying was carried out at a low temperature of about 100° C., an adhesive layer was applied to the side of transverse base material in a state that the reaction of the acrylic adhesive scarcely proceeded, and the polymerization reaction of the acrylic resin was caused to proceed by utilizing the heat (155° C.) in the step for applying the adhesive layer. In the adhesive tape obtained as described above, the acrylic adhesive on the side of the longitudinal base material after the reaction can function as a release layer without providing separately another release layer. The results are shown in Table 1B.

EXAMPLE 5

A tape having 52 μm thickness and 6 mm width and composed of a polyester film (IV value: 0.72, made by Yunitika K.K.) was subjected to stretching and heat-treatment to obtain a flat yarn of 340 d. A unidirectionally aligned material was prepared from this flat yarn by employing a hot melt adhesive (trademark: Byron 300 made by Toyobo Co., Ltd.) in accordance with the method described in Japanese Patent Publication No. Sho 59-6943, and the obtained unidirectionally aligned material was used as a transverse base material. On one hand, a longitudinal base material was prepared in the like manner as in Example 1. Both the transverse base material and longitudinal base material were cross-laminated together in accordance with the method described in Japanese Patent Publication No. Sho 53-38783. In this example, because the above-mentioned hot-melt adhesive could also stick to the longitudinal base material on a cylinder in the cross-laminating step, the treatment for applying a release layer of low-density polyethylene to the base material could be carried out without using any anchoring agent. Then, an adhesive layer was applied to the side of the transverse base material to obtain an adhesive tape. The results are shown in Table 1C.

EXAMPLE 6

A longitudinal base material prepared in the like manner as in Example 1 was subjected to corona treatment, and an ethylene-vinyl acetate-base hot-melt adhesive (trademark: Q2375 J4 made by Henkel-Hakusui K.K.) was applied thereto. A transversely stretched film made of high-density polyethylene (thickness: 25 μm, trademark: Colorian made by Toyo Chemical Co., Ltd.) was laminated with and bonded to the above longitudinal base material. After that, an adhesive agent was applied to the side of the longitudinal base material to obtain an adhesive tape. In this example, the transversely stretched film functioned as a release layer. The results are shown in Table 1C.

EXAMPLE 7

Polypropylene conjugate fine denier filaments composed of a straight polypropylene (MFR: 32 g/10 min) as the core component and a modified polypropylene (trademark: Nisseki N Polymer P4070 made by Nippon Petrochemicals Co., Ltd.) as the sheath component were spun. The filaments were stretched to prepare yarns of 0.8 d in single yarn fineness and 120 d in yarn thickness. A longitudinal base material was made by warping to 50 yarns/25 mm.

In another process, a triple-layer film of 150 μm in thickness was formed by laminating a modified polypropylene (MFR: 4 g/10 min) to both side surfaces of a straight polypropylene (also, MFR: 4 g/10 min). The obtained film was stretched by 1.8 in stretching ratio and numerous slits are transversely made in a cross-stitch pattern. The film was then stretched transversely by 6.5 in stretching ratio to obtain a transversely stretched web. The above-described longitudinal base material was laminated with the transversely stretched web and they were bonded together at 147° C. After that, extrusion lamination of the foregoing modified polypropylene was carried out to the side of the longitudinal base material, while an adhesive agent was applied to the side of the transversely stretched web to obtain an adhesive tape. The results are shown in Table 1C.

Comparative Example 1

Measured values of a conventional cloth adhesive tape made of rayon staple fiber are shown in Table 2.

Comparative Example 2

An adhesive tape was prepared in the like manner as in Example 1 except that a longitudinal base material of filaments of 2 to 3 d in fineness, was used. The results are shown in Table 2. From this Table, it is understood that the obtained adhesive tape is not good in tearable property.

Comparative Example 3

An adhesive tape was prepared in the like manner as in Example 1 except that a longitudinal base material of 1 g/d or lower in strength, was used. The results are shown in Table 2. In this case, the obtained adhesive tape exhibited also poor tearable property.

TABLE 1A

| | Example | | |
|---|---|---|---|
| | 1 | 2-1 | 2-2 |
| Longitudinal Base Material | | | |
| Type | Longitudinally arranged material of stretched PET nonwoven fabric | Longitudinally arranged material of stretched PET multi-layer nonwoven fabric | Longitudinally arranged material of stretched PET nonwoven fabric |
| Fineness (d) | 0.3 | 0.7 | 0.3 |
| Strength (g/d) | 2.2 | 1.7 | 2.2 |
| Elongation (%) | 14 | 12 | 14 |
| Transverse Base Material | | | |
| Type | Transversely arranged material of stretched PET nonwoven fabric | Transversely arranged material of stretched PET nonwoven fabric | Not used |
| Crosswise Adhesion | Embossing A 210° C. | Embossing A 210° C. | — |
| Anchoring | Done | Done | Done |
| Type of Release Layer | PE Extrusion lamination | PE Extrusion lamination | PE Extrusion lamination |
| Adhesive Tape | | | |
| Thickness (μm) | 0.18 | 0.20 | 0.10 |
| Tenacity (kg/50 mm) | 30.6 | 28.6 | 30.0 |
| Tearing Strength (g) | 290 | 250 | 260 |

TABLE 1B

| | Example | | |
|---|---|---|---|
| | 3-1 | 3-2 | 4 |
| Longitudinal Base Material | | | |
| Type | Longitudinally arranged material of stretched PET nonwoven fabric | Longitudinally arranged material of stretched PET nonwoven fabric | Longitudinally arranged material of stretched PET nonwoven fabric |
| Fineness (d) | 0.3 | 0.3 | 0.3 |
| Strength (g/d) | 2.2 | 2.2 | 2.2 |
| Elongation (%) | 14 | 14 | 14 |
| Transverse Base Material | | | |
| Type | Transversely arranged material of stretched PET nonwoven fabric | Transversely arranged material of stretched PET nonwoven fabric | Transversely arranged material of stretched nonwoven fabric |
| Crosswise Adhesion | Urethane adhesive | Urethane adhesive Embossing B | Acrylic adhesive |
| Anchoring | None Corona treatment | None Corona treatment | None Corona treatment |
| Type of Release Layer | PE Extrusion lamination | PE Extrusion lamination | None |

TABLE 1B-continued

| Adhesive Tape | Example | | |
|---|---|---|---|
| | 3-1 | 3-2 | 4 |
| Thickness (μm) | 0.17 | 0.20 | 0.16 |
| Tenacity (kg/50 mm) | 31.1 | 30.2 | 32.0 |
| Tearing Strength (g) | 270 | 160 | 220 |

TABLE 1C

| | Example | | |
|---|---|---|---|
| | 5 | 6 | 7 |
| Longitudinal Base Material | | | |
| Type | Longitudinally arranged material of stretched PET nonwoven fabric | Longitudinally arranged material of stretched PET nonwoven fabric | Longitudinally arranged material of PP filaments |
| Fineness (d) | 0.3 | 0.3 | 0.8 |
| Strength (g/d) | 2.2 | 2.2 | 3.2 |
| Elongation (%) | 14 | 14 | 16 |
| Transverse Base Material | | | |
| Type | PET flat yarn | HDPE transversely stretched film, 25 μm | PP slit wide web |
| Crosswise Adhesion Anchoring | Hot-melt adhesive None | Hot-melt adhesive None Corona treatment | Thermal bonding None |
| Type of Release Layer Adhesive Tape | PE Extrusion lamination | None | PP Extrusion lamination |
| Thickness (μm) | 0.21 | 0.14 | 0.15 |
| Tenacity (kg/50 mm) | 31.7 | 32.5 | 38.1 |
| Tearing Strength (g) | 290 | 260 | 270 |

TABLE 2

| | Comparative Exam. | | |
|---|---|---|---|
| | 1 | 2 | 3 |
| Longitudinal Base Material | | | |
| Type | Commercially available adhesive tape with rayon staple fabric | Longitudinally arranged material of stretched PET nonwoven fabric | Longitudinally arranged material of stretched PET nonwoven fabric |
| Fineness (d) | — | 2.7 | 0.7 |
| Strength (g/d) | — | 1.6 | 0.9 |
| Elongation (%) | — | 12 | 39 |
| Transverse Base Material | | | |
| Type | — | Transversely arranged material of stretched PET | Transversely arranged material of stretched PET |
| | | nonwoven fabric Embossing A 210° C. | nonwoven fabric Embossing A 210° C. |
| Crosswise Adhesion Anchoring | Done | Done | Done |
| Type of Release Layer Adhesive Tape | PE Extrusion lamination | PE Extrusion lamination | PE Extrusion lamination |
| Thickness (μm) | 0.35 | 0.19 | 0.22 |
| Tenacity (kg/50 mm) | 30.4 | 30.2 | 17.4 |
| Tearing Strength (g) | 400 | 610 | 770 |

According to the present invention, it has became possible to provide an adhesive tape having a good transversely tearable property by using an aligned filament material of 1 d or less in fineness which is prepared by stretching a nonwoven fabric with adopting the characteristic advantage of the cross-laminated nonwoven fabric which is thin and can be produced efficiently.

Furthermore, in accordance with the present invention, the production of an adhesive tape made of polyester base fabric could be attained at a low cost, which has been demanded because of its wet strength and heat resistance.

Moreover, other various points were improved in that a transversely stretched film can be in combination, a reactive acrylic adhesive layer is used also as a release layer, and the anchoring treatment requiring an organic solvent was eliminated by the use of a hot-melt adhesive, thereby lowering the production cost and reducing the thickness of the final product.

It will be appreciated by those skilled in the art that the present invention can be embodied in other specific forms without departing from the spirit of the invention. The scope of the invention is, therefore, indicated by the appended claims.

What is claimed is:

1. A base fabric for an adhesive tape comprising at least one longitudinal base material of stretched unidirectionally aligned nonwoven fabric, said nonwoven fabric having a strength of at least 1 g/denier, which nonwoven fabric is made by spinning filaments of a thermoplastic resin into a filament nonwoven fabric and stretching said nonwoven fabric in one direction so that said filaments have a fineness of no more than 1 denier and are aligned substantially in one direction.

2. The base fabric for an adhesive tape as claimed in claim 1, wherein a unidirectionally oriented material, as a transverse base material, is laminated with said longitudinal base material.

3. The base fabric for an adhesive tape as claimed in claim 1, wherein said thermoplastic resin is polyester or polypropylene.

4. The base fabric for an adhesive tape as claimed in claim 1, wherein said unidirectionally oriented material is any one of the group consisting of said stretched unidirectionally aligned nonwoven fabric, a unidirectionally aligned material of flat yarn, a unidirectionally aligned material of split web, and a unidirectionally aligned material of slit tape.

5. The base fabric for an adhesive tape as claimed in claim 1, wherein said longitudinal base material and said transverse base material are thermally bonded by embossing using an embossing pattern having transverse straight line pattern components.

6. An adhesive tape which is made by applying an adhesive layer to one surface of said base fabric of claim 1.

7. The adhesive tape as claimed in claim 6, wherein a synthetic resin layer is applied to at least the other side of said base material.

8. The adhesive tape as claimed in claim 7, wherein said synthetic resin layer is a transversely stretched film.

9. The adhesive tape as claimed in claim 8 wherein an adhesive layer is applied to a unidirectionally oriented material, as a transverse base material of said base fabric and a release layer is applied to said longitudinal base material.

10. A base fabric for an adhesive tape comprising at least one longitudinal base material of stretched unidirectionally aligned nonwoven fabric, said nonwoven formed by spinning a thermoplastic resin into a filament nonwoven fabric and stretching it in one direction so as to align the filaments thereof substantially in one direction; and said longitudinal base material is thermally bonded by embossing, using an embossing pattern having transverse straight line pattern components.

* * * * *